3,105,069
16,17-CYCLIC ACETALS OF 16β-MERCAPTO-17β-HYDROXY ESTROGEN DERIVATIVES AND INTERMEDIATES IN THE PREPARATION THEREOF

Taichiro Komeno, Sumiyoshi-ku, Osaka-shi, and Norio Tokutake, Nada-ku, Kobe-shi, Japan, assignors to Shionogi & Co., Ltd., Osaka, Japan
No Drawing. Filed Aug. 10, 1962, Ser. No. 216,056
6 Claims. (Cl. 260—239.55)

This invention relates to 3-alkoxy-16β-mercapto-17β-hydroxy-1,3,5(10)-estratriene 16,17-cyclic acetals represented by the following formula:

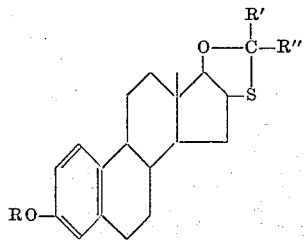

wherein R and R' each represents lower alkyl (e.g. methyl, ethyl, propyl, butyl) and R'' represents hydrogen or lower alkyl (e.g. methyl, ethyl, propyl, butyl).

It is an object of this invention to embody 3-alkoxy-16β-mercapto-17β-hydroxy-1,3,5(10)-estratriene 16,17 - cyclic acetals. Another object is to embody the steroidal cyclic acetals having pharmacological activities. A further object is to embody a synthetic method for preparing the steroidal cyclic acetals. These and other objects will be apparent to those skilled in the art to which this invention pertains from the subsequent description.

The method of this invention is representable by the following scheme:

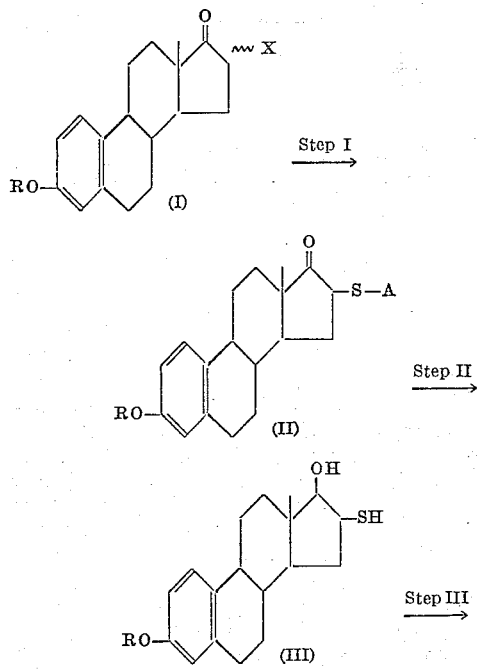

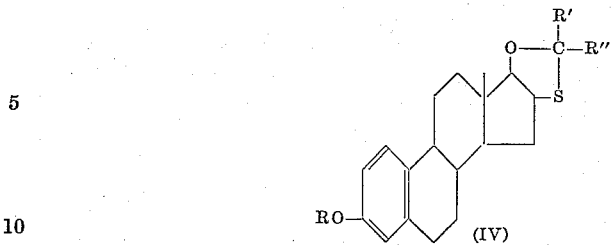

wherein X represents halogen (e.g. chlorine, bromine, iodine), A represents lower alkanoyl (e.g. acetyl, propionyl, butyroyl) or lower alkoxythiocarbonyl (e.g. methoxythiocarbonyl, ethoxythiocarbonyl, propoxythiocarbonyl), R, R' and R'' each has the same significance as designated above and the ripple mark ($\xi$) represents α- or β-configuration.

The starting material of this invention is 3-alkoxy-16-halogeno-17-oxo-1,3,5(10)-estratriene of Formula I. The 16-haloestratriene I consists of the 16α-haloestratriene and the 16β-haloestratriene, each being representable by the following formula:

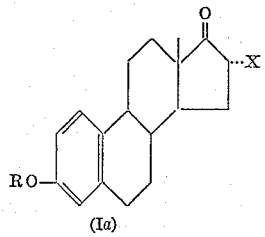

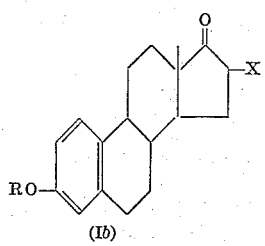

wherein R and X each has the same significance as designated above. The 16α-haloestratriene Ia can be prepared from estrone (3-hydroxy-17-oxo-1,3,5(10)-estratriene) in a conventional manner [W. S. Johnson et al.: J. Am. Chem. Soc., 79, p. 2005 (1957); G. P. Mueller et al.: J. Am. Chem. Soc., 80, p. 1769 (1958)]. The 16α-haloestratriene Ia can be readily converted into the 16β-haloestratriene Ib according to a per se conventional procedure, i.e. by the treatment of the former with alumina or dimethylformamide and lithium bromide.

In the first step, the 16-haloestratriene I is reacted substantially with a sulfur-containing organic acid such as thioalkanoic acid (e.g. thioacetic acid, thiopropionic acid, thiobutyric acid) and alkyldithio carbonic acid (e.g. methyldithiocarbonic acid, ethyldithiocarbonic acid, propyldithiocarbonic acid). Usually, the reaction is carried out by treating the 16-haloestratriene I with an alkali metal salt of the said sulfur-containing organic acid (e.g. sodium thioacetate, potassium thioacetate, potassium thiopropionate, potassium thiobutyrate, potassium methyldithiocarbonate, sodium ethyldithiocarbonate, potassium ethyldithiocarbonate, sodium propyldithiocarbonate, potassium propyldithiocarbonate) in a suitable medium (e.g. acetone, ether, dioxane, tetrahydrofuran) at room temperature for several hours.

In the second step, the resultant 16-substituted thioestratriene II is reduced with an alkali metal hydride (e.g. lithium aluminum hydride, lithium borohydride, sodium borohydride). The reaction is usually carried out by treating the 16-substituted thioestratriene II with the said reducing agent in a suitable medium (e.g. ether, dioxane, tetrahydrofuran, benzene), if necessary, while heating.

In the third step, the resulting 16-mercaptoestratriene III is condensed with a carbonyl compound such as alkanoyl aldehyde (e.g. acetaldehyde, propionaldehyde, butyraldehyde) and dialkyl ketone (e.g. acetone, methyl ethyl ketone, diethyl ketone, methyl butyl ketone, dipropyl ketone). The reaction can be performed by heating the 16-mercaptoestratriene III with the said carbonyl compound in the presence of an acidic catalyst (e.g. p-toluenesulfonic acid, sulfuric acid).

Although the method of this invention is hereinbefore illustrated step by step, these steps may be executed successively without the isolation of the product in each step, especially in the case of that the prepared intermediate is not stable. For instance, the 16-mercaptoestratriene III is relatively unstable and preferred to be subjected to the reaction in the subsequent step without its isolation from the reaction mixture.

The final products of this invention are 3-alkoxy-16β-mercapto-17β-hydroxy-1,3,5(10)-estratriene 16,17 - cyclic acetals of Formula IV. The steroidal cyclic acetals IV show a variety of pharmacological activities such as catabolic activity, uterotropic activity and anti-DOCA (desoxycorticosterone acetate) activity. For instance, 3-methoxy - 16β - mercapto - 17β - hydroxy-1,3,5(10)-estratriene 16,17-acetonide (I, R=R'=R''=CH$_3$) significantly decreased the weights of liver, kidney, spleen, seminal vesicles, ventral prostates, epididymal fat pad, perireal fat pad of male mice and increased the weights of uterus and pituitary of female mice, when subcutaneously administered. In the same test, the significant reduction of the body weight gain was observed in male mice, but not in female mice. The other products of this invention also show the similar action. Thus, the steroidal cyclic acetals IV are useful, for instance, as catabolic agents, uterotropic agents and fat loosing agents.

The following examples set forth illustratively presently-preferred embodiments of the invention.

In the examples, the abbreviations have the following significances: mg., milligram(s); ml., millilitre(s); Anal. calcd., analysis calculated; and ° C., degrees centigrade. Other abbreviations have conventional significances.

*Example 1*

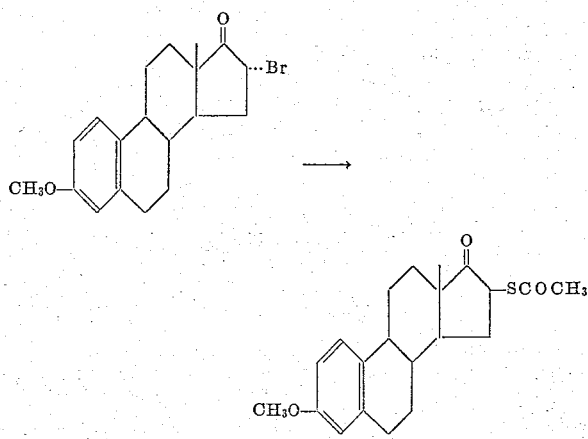

A suspension of 3-methoxy-16α-bromo-17-oxo-1,3,5(10)-estratriene (142 mg.) and potassium thioacetate (80 mg.) in acetone (6 ml.) is stirred for 3.5 hours at room temperature (10 to 25° C.). Adding water to the reaction mixture, the precipitate is collected by filtration, dried and crystallized from methanol. The crude crystals are recrystallized from acetone-methanol (5:1) to give 3-methoxy - 16β - acetylthio-17-oxo-1,3,5(10)-estratriene (124 mg.) as white scales melting at 186 to 187° C. [α]$_D^{21°}$ +154.9±2° (chloroform).

Anal. calcd. for $C_{21}H_{26}O_3S$: C, 70.35; H, 7.31; S, 8.94. Found: C, 70.34; H, 7.40; S, 8.94.

*Example 2*

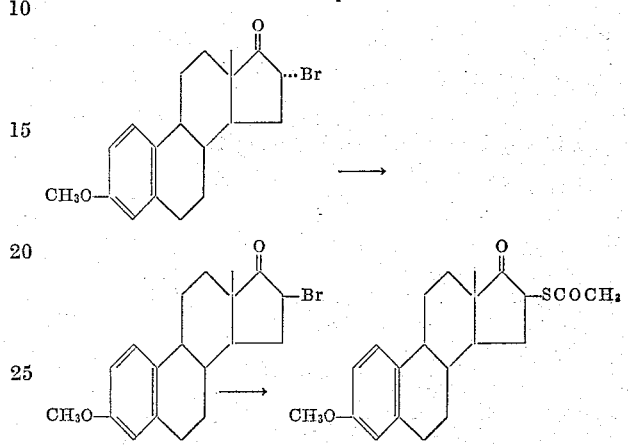

A solution of 3-methoxy-16α-bromo-17-oxo-1,3,5(10)-estratriene (200 mg.) in acetone is treated with alumina and, after 60 hours, eluated to give 3-methoxy-16β-bromo-17-oxo-1,3,5(10)-estratriene (40 mg.).

A suspension of 3-methoxy-16β-bromo-17-oxo-1,3,5(10)-estratriene (24 mg.) and potassium thioacetate (15 mg.) in acetone (3 ml.) is stirred for 3.5 hours at room temperature (10 to 25° C.). Adding water to the reaction mixture, the precipitate is collected by filtration, dried and crystallized from acetone-methanol (5:1) to give 3-methoxy-16β-acetylthio-17-oxo-1,3,5(10)-estratriene (18 mg.) as white crystals melting at 184 to 187° C.

*Example 3*

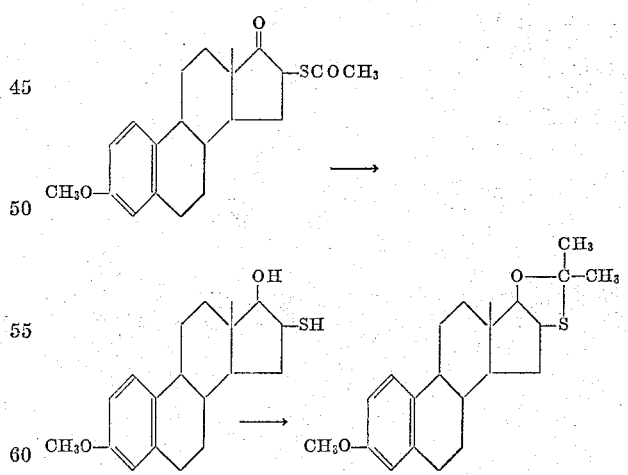

To a suspension of lithium aluminum hydride (110 mg.) in anhydrous ether (12 ml.), there is added dropwise a solution of 3-methoxy-16β-acetylthio-17-oxo-1,3,5(10)-estratriene (260 mg.) in tetrahydrofuran (30 ml.) while stirring at room temperature (10 to 25° C.) in 10 minutes. Then, the resultant solution is refluxed for 3.5 hours. Adding water to the reaction mixture, the precipitate is treated with dilute hydrochloric acid. The ether layer is dried over anhydrous sodium sulfate and the ether is removed to give the residue containing 3-methoxy-16β-mercapto-17β-hydroxy-1,3,5(10)-estratriene.

To the above-obtained residue, there are added p-toluenesulfonic acid (20 mg.) and acetone (10 ml.), and the resultant mixture is refluxed for 4 hours under moisture-free conditions. The precipitated white needles are removed by filtration while hot. To the filtrate, there is added water (30 ml.), and the precipitate is collected by filtration and dried to give the crude crystals (146.6 mg.). The crude crystals are chromatographed on alumina (7 g.) using benzenepetroleum ether (1:1) as a solvent. The thus-obtained crude 3 - methoxy-16β-mercapto-17β-hydroxy-1,3,5(10)-estratriene 16,17-acetonide (102.7 mg.) is recrystallized from acetone to give white needles (77 mg.) melting at 169 to 170° C.

Anal. calcd. for $C_{22}H_{30}O_2S$: C, 73.70; H, 8.43; S, 8.94. Found: C, 74.03; H, 8.57; S, 8.86.

What is claimed is:

1. A compound having the following formula:

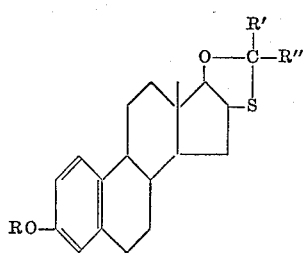

wherein R and R' each represents lower alkyl and R" represents a member selected from the group consisting of hydrogen and lower alkyl.

2. 3-methoxy - 16β - mercapto-17β-hydroxy-1,3,5(10)-estratriene 16,17-acetonide.

3. A compound having the following formula:

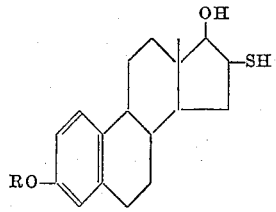

wherein R represents lower alkyl.

4. 3-methoxy - 16β - mercapto-17β-hydroxy-1,3,5(10)-estratriene.

5. A compound having the following formula:

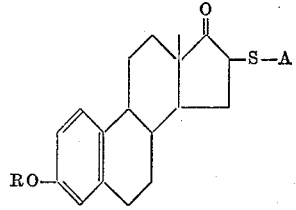

wherein R represents lower alkyl and A represents a member selected from the group consisting of lower alkanoyl and lower alkoxythiocarbonyl.

6. 3-methoxy - 16β - acetylthio-17-oxo-1,3,5(10)-estratriene.

No references cited.